(12) United States Patent
Hoyer et al.

(10) Patent No.: US 11,900,257 B2
(45) Date of Patent: Feb. 13, 2024

(54) METHOD FOR REPRESENTING AN ENVIRONMENT OF A MOBILE PLATFORM (71) Applicant: Robert Bosch GmbH, Stuttgart (DE)

(72) Inventors: Lukas Hoyer, Biederitz (DE); Volker Fischer, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 497 days.

(21) Appl. No.: 17/283,847

(22) PCT Filed: Mar. 9, 2020

(86) PCT No.: PCT/EP2020/056200
§ 371 (c)(1),
(2) Date: Apr. 8, 2021

(87) PCT Pub. No.: WO2020/187625
PCT Pub. Date: Sep. 24, 2020

(65) Prior Publication Data
US 2021/0382495 A1    Dec. 9, 2021

(30) Foreign Application Priority Data

Mar. 19, 2019 (EP) .................................... 19163822

(51) Int. Cl.
*G06N 3/08* (2023.01)
*G06N 3/082* (2023.01)
(Continued)

(52) U.S. Cl.
CPC .............. *G06N 3/082* (2013.01); *G01S 13/89* (2013.01); *G01S 13/931* (2013.01);
(Continued)

(58) Field of Classification Search
CPC .......... G06N 3/082; G06N 3/04; G06N 3/045; G06N 3/048; G01S 13/89; G01S 13/931;
(Continued)

(56) References Cited

U.S. PATENT DOCUMENTS

2023/0122119 A1* 4/2023 Wu ........................ B60W 30/09
701/301

OTHER PUBLICATIONS

International Search Report for PCT/EP2020/056200 dated Jun. 5, 2020.
(Continued)

*Primary Examiner* — Michael V Kerrigan
(74) *Attorney, Agent, or Firm* — NORTON ROSE FULBRIGHT US LLP; Gerard A. Messina (57) ABSTRACT

A method and system for representing an environment of a first mobile platform. The method includes: capturing features of the environment by discrete time sequences of sensor-data from at least two sensors and respective time markers; determining distances of the first mobile platform to the features of the environment; estimating semantic information of the features of the environment; transforming the semantic information of the features of the environment into a moving spatial reference system, wherein a position of the first mobile platform is at a constant site, using the respective determined distances and respective time markers; creating an input tensor using sequences of the transformed semantic information of the features of the environment, corresponding to the sequences of the sensor data of the at least two sensors; generating an output tensor that represents the environment using a deep neural network at a requested point in time and the input tensor.

12 Claims, 5 Drawing Sheets

(51) Int. Cl.
| | |
|---|---|
| *G01S 13/89* | (2006.01) |
| *G01S 13/931* | (2020.01) |
| *G05D 1/00* | (2006.01) |
| *G06N 3/04* | (2023.01) |
| *G06V 20/56* | (2022.01) |
| *G06F 18/25* | (2023.01) |
| *G06V 10/764* | (2022.01) |
| *G06V 10/82* | (2022.01) |
| *G06V 20/20* | (2022.01) |

(52) U.S. Cl.
CPC ......... *G05D 1/0246* (2013.01); *G05D 1/0255* (2013.01); *G05D 1/0257* (2013.01); *G06F 18/253* (2023.01); *G06N 3/04* (2013.01); *G06V 10/764* (2022.01); *G06V 10/82* (2022.01); *G06V 20/20* (2022.01); *G06V 20/56* (2022.01); *G01S 2013/9323* (2020.01); *G01S 2013/9324* (2020.01)

(58) Field of Classification Search
CPC ..... G01S 2013/9323; G01S 2013/9324; G01S 13/865; G01S 13/867; G01S 17/86; G01S 17/931; G05D 1/0246; G05D 1/0255; G05D 1/0257; G06F 18/253; G06V 10/764; G06V 10/82; G06V 20/20; G06V 20/56

See application file for complete search history.

(56) References Cited

OTHER PUBLICATIONS

Julie Dequaire, et al., "Deep Tracking in the Wild: End-to-End Tracking Using Recurrent Neural Networks," International Journal of Robotics Research, vol. 37, No. 4-5, 2017, pp. 1-21. <https://www.robots.ox.ac.uk/~mobile/Papers/2017_IJRR_Dequaire.pdf>.
Marcel Schreiber et al., "Long-Term Occupancy Grid Prediction Using Recurrent Neural Networks", Cornell University Library, 2019, pp. 1-8. <https://arxiv.org/pdf/1809.03782.pdf>.

* cited by examiner

METHOD FOR REPRESENTING AN ENVIRONMENT OF A MOBILE PLATFORM

FIELD

The present invention relates to a method for representing an environment of a mobile platform as well as a systems configured to execute the method, wherein the environment is characterized by sequences of data of a plurality of sensors.

BACKGROUND INFORMATION

Deep learning methods have been investigated for controlling at least partially autonomous systems, such as self-driving vehicles, or robots as examples for mobile platforms. An essential part of such at least partially autonomous systems is their capability to perceive complex situations in respect to their environment.

A requirement for such an at least partially autonomous system to operate safely and effectively is to interpret its surrounding environment, and estimate the state of this environment over time for, e.g., decision-making processes, such as motion planning and control.

In order to enable intelligent decision making, a common interface between a plurality of different sensors for perception of the environment and downstream control has to be provided.

An environment representation can be used as a common interface between perception and other system components, as, e.g., decision making, and hence should have certain properties as basis for an at least partially autonomous system to operate safely and effectively, and for the fusion of a plurality of sensor data.

SUMMARY

The present invention is directed to a method for representing the environment surrounding a mobile platform and a computer program product, a computer-readable storage medium, and an at least partially autonomous system, which are configured to perform the method.

Advantageous example embodiments and modifications of the present invention are disclosed herein. All combinations of at least two of the features disclosed in the description and the figures fall within the scope of the present invention. In order to avoid repetition, features disclosed in accordance with the method shall also apply to the mentioned systems.

In accordance with an example embodiment of the present invention, a modularly structured method is provided to predict an environment representation of a moving platform at a requested time, based on a fusion of sequences of data of a plurality of sensors characterizing the environment of that platform. The example method utilizes a deep neural net and is modularly structured in such a way, that resulting interfaces of the modules of the method are accessible and interpretable to experts.

By this, the method is transparent in respect to the contribution of the individual modules and improves the reliability of a perception of the environment to support the design of a robust agent or at least partially autonomous system in the context of safety-critical systems, such as at least partially autonomous vehicles.

To achieve these and other advantages and in accordance with the present invention, as embodied and broadly described herein, there is provided a method for representing an environment of a first mobile platform, wherein features of the environment are captured by discrete time sequences of sensor-data and respective time markers, originating from at least two sensors.

A mobile platform may be an at least partially autonomous system, which is mobile, and/or a driver assistance system. An example may be an at least partially autonomous vehicle respectively a vehicle including a driver assistance system. That means in this context an at least partially autonomous system includes a mobile platform in respect to at least partially autonomous functionality, but a mobile platform also includes vehicles and other mobile machines including driver assistance systems. Further examples of mobile platforms may be driver assistance systems utilizing multiple sensors, mobile multi-sensor robots like, e.g., robotic vacuum cleaner, or robotic lawn mower, a multi-sensor surveillance system, a manufacturing machine, a personal assistant or an access control system. Each one of these systems may be fully or partially autonomous systems.

These sensor data, which may originate from different sensor-types, characterizing the environment of the mobile platform and/or the sensor in respect to different physical properties, may be provided sequentially at discrete moments in time together with a corresponding time marker to assign the data of the environment to the time when the sensor data were recorded. Alternatively, continuous sensor data may be sequentially collected at discrete time steps with the corresponding time markers as an additional step of the method. It has to be taken into account that the number of sensors used for this method may, e.g., exceed twenty sensors.

Some types of such sensors can provide direct physical information about the environment like, e.g., LIDAR- or RADAR-sensors directly providing distances in respect to features of the environment. Other sensors as, e.g., digital cameras, or digital video cameras provide digital images characterizing the environment with grey values and/or with colour data. Such digital images may be semantically richer representations of the environment than, e.g., RADAR-sensor data. Digital stereo-cameras, e.g., provides both, images of the environment and the corresponding distances for each pixel of the digital image.

Another step of the method in accordance with an example embodiment of the present invention determines the distance of the first mobile platform with respect to the features of the environment. This may be done by a special type of sensor, which is able to directly detect distances as, e.g., laser- or radar-measurements. Alternatively, the distance can be an estimation from single digital images, e.g., by using a specially trained neural network, or by model based estimations. Stereo camera systems may provide the images and the respective distances. Further, on, the determination of the distance may be performed by a pair of sensors, one sensor directly measuring distances the other sensor is providing data for characterizing other properties of the environment and a calibration procedure may link the features of the environment to the corresponding distance.

If a sensor characterizing the environment of the platform is located outside of the platform, the position of the sensor in respect to the moving platform has to be determined in addition to the distance of a feature of the environment to the sensor, to determine the distance of the features of the environment to the moving platform.

Another step of the method is the estimation of semantic information of the features of the environment.

This semantic information of the features of the environment may be estimated utilizing model based methods, or alternatively semantic labels of the features are determined based on a state-of-the-art deep Convolutional Neural Network (CNN), which is trained to estimate semantic information of the environment including real world traffic scenery.

That means the estimation of semantic information of the features of the environment is conducted using the sequences of data of each sensor characterizing the environment as input data for the mentioned methods. For example, in the case of camera-data semantic information is spatially referenced with respect to the sensor coordinate system, e.g., in pixel space of the camera data.

Estimation of semantic information means that objects identified by the features of the environment are attributed to different semantic classes including, e.g., static and dynamic objects. Further classes may include, e.g., pedestrians, buses, cars, cyclists, poles, traffic signs, streets, sidewalks and traffic lights etc.

The semantic information that is the class information may be different between the individual sensor sources, e.g., cars are detected by radar-sensors and digital cameras, but pedestrians only by digital cameras.

Sensor-data originated by sensor types which directly provide physical data do not provide semantic information. For ease of understanding of features of the method in accordance with an example embodiment of the present invention, the term semantic information of a feature of the environment includes the physical data collected by such a type of sensor. Such physical data will be handled by this method in a corresponding way to sensor-data, which may be semantically represented.

Because of the estimation of semantic information of the features of the environment for all individual sensors the output of this step is interpretable and accessibility for an expert to improve reliability, traceability and error analysis, due to this transparent interfaces, e.g., in order to design a robust agent.

In accordance with an example embodiment of the present invention, another step of the method is a transformation of the semantic information of the features of the environment into a moving spatial reference system, wherein a position of the first mobile platform is at a constant site, using the respective determined distances and respective time markers.

Sensors usually yield their data referenced relative to their own coordinate system. To support fusion of the sensor-data from different sensors, which may also point to different regions of the environment or which may be of different type, the described method is using an egocentric, respective agent-centric or platform-centric reference system for environmental representation. Alternatively, the center of the reference system is outside of the platform, but the reference system is set up in such a way as to keep the platform at a constant site within the moving reference system. Even in this case such a reference system may be named as being centered.

The transformation of the semantic information of the features of the environment into the moving reference system, the moving reference system shortly named grid, is done by means of spatial reference information and temporal reference information sensor-feature-wise, and model-based into a 2- or 3-dimensional grid representation. The spatial reference information may be, e.g., the distance of the features of the environment to the mobile platform or other depth information of the features in respect to the sensors. The temporal reference information may be the time marker of the sequence of images when the images were taken.

These 2- or 3-dimensional grid representations may be different for different sensors, e.g., they may yield semantic segmentations for different classes.

Furthermore, these grid representations may have different spatial resolutions. For further processing these spatial resolutions may be scaled up or down to a fitting spatial resolution.

Building such a spatial reference system respectively grid of semantic information of the features of the environment by transforming the sensor data into a moving spatial reference system, semantic information of the features are stored in this spatial grid, where each cell of the grid covers a certain region of the environment. Objects represented by their semantic features may be placed in such a spatial grid, for which each grid cell encodes a spatial reference.

To represent the environment using a unified moving spatial reference system for all the different sensor-data of a plurality of sensors, results in a constant computational and memory complexity and in a computation-time and memory footprint of the representation of the environment, which is independent from the density or respectively number of nearby objects in the scene of the environment.

This grid-based form of representation of the environment may be advantageous for decision making if the method is used to control an at least partially autonomous system, because, in most cases, a decision of an at least partially autonomous system may depend on the interaction between nearby objects and the at least partially autonomous system. Grid-based representation of the environment as described here place features in a spatial grid, where each grid cell may cover a certain region. Hence, a grid-based representation of sensor-data has constant computational and memory complexity. Further, an egocentric environment representation scales better for at least partially autonomous systems moving large distances as the site of an at least partially autonomous system stays centered and distant, resulting in that irrelevant information can be discarded.

In accordance with an example embodiment of the present invention, another step of the method is to create an input tensor using sequences of the transformed semantic representation of the features of the environment, corresponding to the sequences of the sensor data of the at least two sensors.

For a 2-dimensional reference system that means that the tensor is created by stacking 2-dimensional grids, generated by the transformation of the spatial coordinates of the sensors to the moving spatial reference system, comprising semantic representation of the data from the plurality of different sensors. For the application of at least partially autonomous flying systems as, e.g., drones, the moving spatial coordinate system would be a 3-dimensional coordinate system, where the platform is at a constant site within that reference system.

The order of the stacked grids of data from an individual sensor should be in constant chronological series, corresponding to the captured sequence of sensor-data by using the captured time markers. Besides the temporal order of frames from each single sensor, also the grids from different sensors are stacked in the same way for every frame.

Further, the method involves the step of generating an output tensor that represents the environment at a requested point in time using a deep neural network and the input tensor, wherein the deep neural network is trained with training input tensors and true information training output tensors as to accurately reproduce arbitrary environment representations at the requested point in time.

The deep neural network may be an artificial neural network (ANN), which is a computing system vaguely inspired by the biological neural networks that constitute animal brains. The neural network itself is not an algorithm, but a framework for many different machine learning algorithms to work together and process complex data inputs.

Such a system learns to perform tasks by considering examples, generally without being programmed with any task-specific rules. An ANN is based on a collection of connected units or nodes called artificial neurons. Each connection can transmit a signal from one artificial neuron to another. An artificial neuron that receives a signal can process it and then signal additional artificial neurons connected to it.

In common ANN implementation, the signal at a connection between artificial neurons is a real number, and the output of each artificial neuron is computed by some non-linear function of the sum of its inputs. Artificial neurons and connections, also named edges, typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

The deep neural network as disclosed herein and containing all trainable parameters may combine the aligned semantic grids from different sensors and past times into one prediction including dynamic object transformation, temporal filtering, multi-sensor fusion and prediction of environment dynamics.

To generate a predictive and fused output grid from a stack of input grids, any architecture as suited for semantic segmentation can be used. Typically, these architectures can be separated into two parts: First, a sequence of layers generates a grid of lower resolution compared to the input containing the desired information, and second a sequence of up sampling layers recovers the desired output resolution (e.g., the input resolution). Additional skip-connection can be used in combination with this up sampling to recover detailed spatial information. In the first sequence of layers, typically used layers are: convolutional network layers, e.g., with or without dilation, with or without depth-wise separation, normalization layers, e.g., batch-normalization, layer-normalization, local-response-normalization, activation functions, e.g., rectified linear unit (ReLU), exponential linear unit (elu), scaled exponential linear units (selu), sigmoid function, or tan h function.

This deep neural network may be trained with training input tensors and true information training output tensors as to accurately reproduce arbitrary environment representations at the requested time. That means the environment representation, which is described by the output tensor generated by the neural network, describes the environment at a point in time, which is determined by the training of the network. If the network is trained in such a way as to estimate the environment in the future, the output tensor may represent the environment for the same time span into the future.

In this way, the neural network may fuse the semantic grids of all the individual sensors included in the input tensor and yield a predictive semantic grid output tensor at the requested time. Even if the mobile platform is moving during a sensor is capturing the environment in discrete time sequences, the neural network may fuse the semantic grids in such a way as to estimate the environment representation.

This task, which is the fusion of the semantic grids and the estimation of the environment representation, may alternatively be provided by a physical model without training, e.g., by grid-wise calculation of the mean.

The requested time may be a point in time in the future to compensate for system-inherent latency, which is originated by the sensors and their down-stream signal-processing as, e.g., performing the semantic representation generation calculation, which may induce a temporal delay between the actual present state of the world, and the agent's or at least partially autonomous system belief about this state. By choosing the requested time in accordance to the system-inherent latency, the output tensor represents the belief of the neural net about the actual situation of the environment. By this design of the method in accordance with an example embodiment of the present invention, the environment representation may compensate the short-term system-inherent latencies that mean that the neural net estimates the environment for short time horizons into the future of the captured sequences of sensor-data.

Because at least partially autonomous systems or agents, which may use the method for environment representation in accordance with an example embodiment of the present invention, often interact with highly dynamic environments, it is necessary to handle such system-inherent latencies.

Data of the input tensor from sensors providing direct physical information about the features of the environment the deep neural net will not estimate the environment representation but will perform a regression. For ease of understanding, the input tensor and the output tensor may include such physical representation of features of the environment in addition to the semantic representation of the features of the environment and for ease of description of the method in accordance with the present invention, the term semantic representation will always include the physical representation of features resulting from such type of sensors.

Overall, that means that the method in accordance with the present invention provides an environment representation (ER) that is: egocentric to support the fusion of the sensor data into one reference system, which is moving together with the mobile platform. Because there are accessible and interpretable results at the interface of the method steps the method is transparent to experts. Further, the method is predictive to compensate system-inherent latencies, and grid-based to be independent of the number of objects in the environment.

Examples for the application of such an environment representation method of a first mobile platform may be a representation of the environment of an at least partially autonomous vehicle, which may be seen as an example for a mobile platform. Further examples of mobile platforms may be driver assistance systems utilizing multiple sensors, mobile multi-sensor robots like, e.g., robotic vacuum cleaner, or robotic lawn mower, a multi-sensor surveillance system, a manufacturing machine, a personal assistant or an access control system. Each one of these systems may be fully or partially autonomous systems.

As an example, the method in accordance with example embodiment(s) of the present invention may be used for emergency braking. If the requested time is defined such as to request the neural net to estimate the respective environment representation further in the future, critical situations which could lead to an accident in the near future, e.g., in respect to pedestrians can be foreseen and fast and predictive action of the emergency system can be triggered. To adopt the example method(s) for such an application, the deep neural net may be trained, e.g., with emphasis to interaction of the at least partially autonomous system and pedestrians.

If such a critical situation would be detected using the environment representation as described as input to a decision system it may lead to an emergency brake or an early slow down of the speed controlled by the supporting emergency brake system.

In addition to support, this application emphasis may be put to train the neural net for generation of the semantic representation of pedestrian, and a further decision step would constantly determine distances between the mobile platform and identified pedestrian utilizing the method for environment presentation in accordance with example embodiments of the present invention.

Another exemplary application of the method for environment representation in accordance with an example embodiment of the present invention may be an aimed signaling of next actions to the environment. That means that the next action of the at least partially autonomous system using the example method to generate an environment presentation may be used to selectively convey the current state, or the next action of the at least partially autonomous system to persons, or vehicles within the immediate vicinity.

For example, a passing cyclist may be informed that a car door is about to open, or that the at least partially autonomous system will turn off, or the at least partially autonomous system or the mobile platform may specifically indicate to other persons or vehicles that this person or vehicle was perceived by the at least partially autonomous system or mobile platform using the example method(s) for generation of a prediction of the environment. Specifically the vicinity of the other persons or vehicles may be identified using the environment representation as disclosed.

A further application of the method for environment representation in accordance with an example embodiment of the present invention utilizes the inherent property of the environment presentation to carry all the information collected by the plurality of sensors as an easy-to-understand interface by projecting the output tensor into a bird's-view of the environment of the mobile platform using this method, by color coding the semantic information in a two-dimensional grid. This may be used in the event of an accident or to follow up decision making processes of the mobile platform.

For example, in case of a faulty behavior of an at least partially autonomous system, one may differentiate whether a perception-error or a faulty decision-making was the root cause. The environment representation as a two-dimensional color coded map may also directly or indirectly using signaling devices like light signals or similar be used for presenting the momentary understanding of the situation of environment of an at least partially autonomous system or a mobile platform to a passenger. Such a system could be directly fed by the output tensor for creation of the map and an analysis tool could determine distances to decide what information has to be provided to others. This may also increase the trust for working at least partially autonomous systems to work correctly.

According to an aspect of the present invention, the sensor-data originate from at least one sensor, which is mechanically connected to the first mobile platform.

In this embodiment, the sensor mechanically connected to the mobile platform is directly moving together with the platform.

According to another aspect of the present invention, the transformation of the semantic information and/or the physical information of the features of the environment into a moving spatial reference system is done by taking into account an ego-motion of the first mobile platform.

The ego-motion of the mobile platform is the movement of the platform during capturing of the features of the environment utilizing sensors in form of discrete time sequences of sensor-data, where the sensors move together with the platform. This may be the case because the sensor-data originate from sensors mechanically connected to the platform. This movement may result in sequences of sensor-data, which may originate from different points in time in the past and where static objects seem to move in a scene of the environment in respect to the moving reference system.

To compensate for this effect and to improve the environment representation, the transformation of the semantic representation of the features of the environment takes into account the ego-motion of the platform or respectively a sensor by transforming the spatial coordinates of the features of the environment into the moving reference system in such a way that static features of the environment keep their site within the moving reference system. Correspondingly the calculation is based on the time markers assigned to the respective sequences of sensor-data, the requested point in time for the generation of the output tensor, and a the ego-motion of the platform which may be linear estimated in respect to the movement until the requested point in time.

The ego-motion of the mobile platform itself normally may be readily available in driving scenarios by using, e.g., external camera-data, odometry-data, data from an inertia measurement unit (IMU), global positioning data (GPS) or other methods providing data about the ego-motion of the mobile platform.

According to another aspect of the present invention, at least one sensor of the at least two sensors is mechanically connected to a second mobile platform.

If the method in accordance with the present invention is used for a first, at least partially autonomous vehicle, sensor-data may be provided by a second vehicle used to represent the environment of the first at least partially autonomous vehicle.

According to another aspect of the present invention, each of the at least two sensors are moving independently from the first mobile platform. In such an embodiment of the present invention, the position of each of the moving sensors, which are moving independently in respect to the mobile platform, have to be provided for the transformation of the sensor-data into the moving reference system.

According to another aspect of the present invention, the determination of the distances of the first mobile platform to the features of the environment is performed by using a stereo camera, or a LIDAR-sensor, or a RADAR-sensor, or an Ultrasound-sensor or a neural network technique estimating distances based on individual images of a digital camera. For this, usually deep convolutional networks with a regression output layer yielding disparity or depth are used. Beside the listed methods for determining the relevant distances, also other methods to determine a distance may be used to apply the method in accordance with the present invention.

According to another aspect of the present invention, the semantic representation of the features of the environment may be generated by using a neural network. Such a network may be a deep Convolutional Neural Network, trained for semantic representation of real world traffic scenery.

According to another aspect of the present invention, the deep neural network may be an encoder-decoder convolutional neural network.

Such an encoder-decoder convolutional neural network is described above and discussed in detail below when describing an embodiment of the present invention.

According to another aspect of the present invention, a motion action of the at least partially mobile platform is executed depending on the content of the output tensor.

Such a motion action may depend on the content of the output tensor to move a specific trajectory out of a plurality of trajectory, a reduction of the velocity of the platform, an emergency stop of the platform or other motion actions, e.g., with the goal to keep the at least partially mobile platform on a safe track to the target.

According to another aspect of the present invention, a computer program product comprising instructions is provided, which, when the program is executed by a computer, cause the computer to carry out the describe method.

According to another aspect of the present invention, a computer-readable storage medium comprising instructions is provided which, when executed by a computer, cause the computer to carry out the method according to the described method.

According to another aspect of the present invention, an at least partially autonomous system comprising a controller is provided, which is configured to carry out the method as described above, and to execute or initiate a motion action of the at least partially mobile platform depending on the content of the output tensor.

Such an at least partially autonomous system may be a mobile platform where the controller may execute a motion of the platform itself, it may be a mobile platform where the controller initiates an action of a driver, or it may be a robot with an actuator where the controller may execute a motion action of the actuator.

As an example such a motion action which is depending on the content of the output tensor may be a movement according to a specific trajectory out of a plurality of trajectory, a reduction of the velocity of the platform, an emergency stop of the platform or other motion actions, e.g., with the goal to keep the at least partially mobile platform on a safe track to the target.

BRIEF DESCRIPTION OF THE DRAWINGS

The figures, which are included to provide a further understanding of the present invention and are incorporated herein and constitute a part of the present application, illustrate embodiments of the present invention and together with the description serve to explain the features of the present invention.

DETAILED DESCRIPTION OF EXAMPLE EMBODIMENTS

Figure 1:
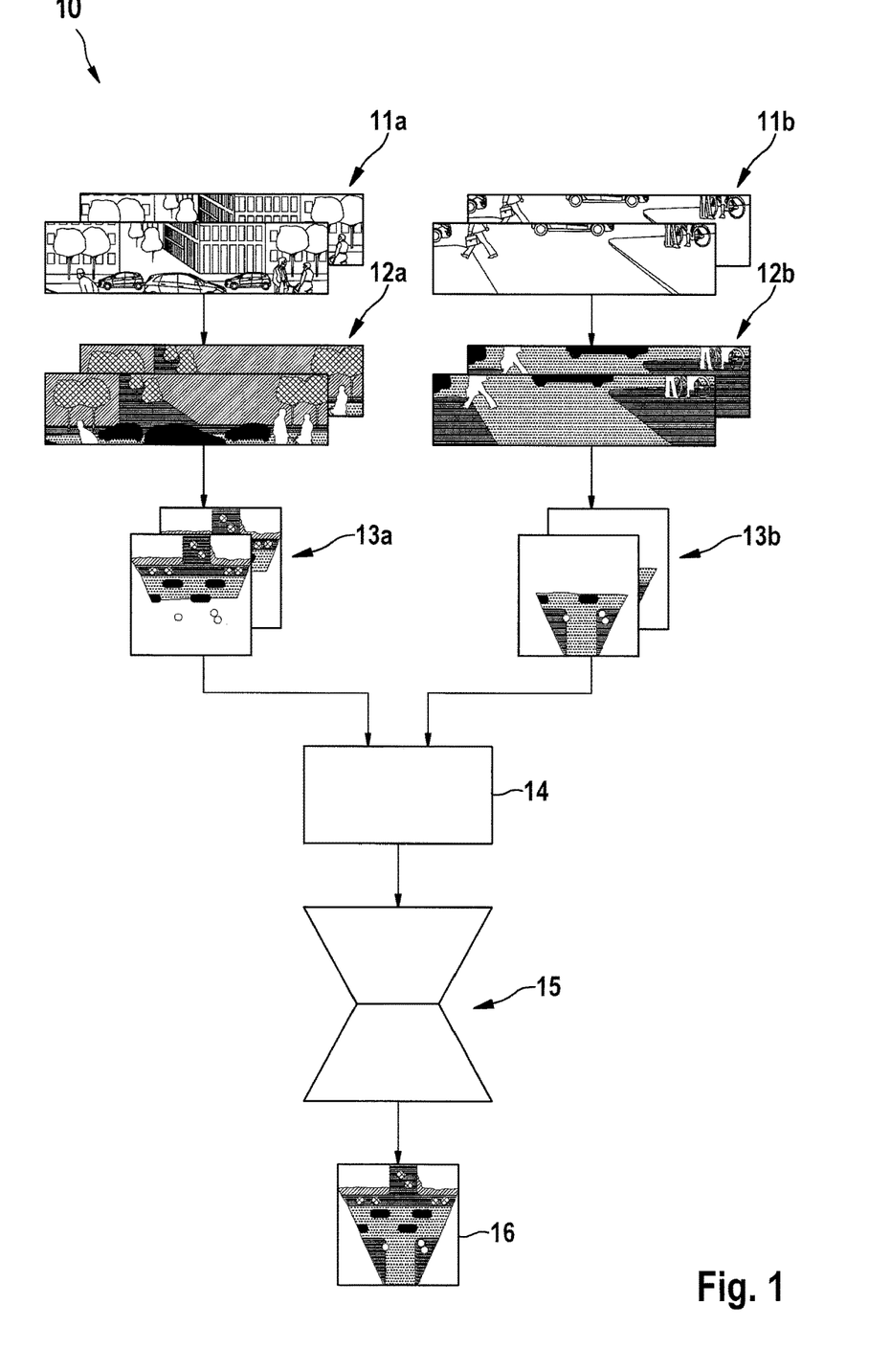
FIG. 1 shows a schematic overview of a method to generate the environment representation, in accordance with an example embodiment of the present invention.

A schematic overview on an embodiment of the method for representing an environment of a first mobile platform is shown in FIG. 1. The features of the environment are captured by discrete time sequences of sensor data of two sensors, which are represented here as image sequences 11a, 11b of two digital cameras from past times. The respective time markers of the images are recorded when they were taken and are captured together with the images. The at least two sequences of images may be taken at a different rate and at different times.

The two digital cameras characterize with their sequences of digital images the environment of a mobile platform and may be mounted at the platform or outside of the platform or one at the platform and the other sensor at a defined site outside of the platform. Alternatively at least one sensor is mounted at another mobile platform. The part of the environment, which is characterizes by the sensors, may be different. That means that, e.g., in case of digital cameras that they may point at different directions in respect to the mobile platform.

The captured digital camera-data are semantically classified by, e.g., assigning semantic labels for each pixel of the digital camera data by a model based method or a neural net as described above. This results in case of images of digital cameras in sequences of images or frames with semantic labels 12a, 12b about classes of objects for each pixel.

These sequences of semantically classified images 12a, 12b of the two digital cameras are respectively transformed into a spatial reference system, which is moving together with the mobile platform. The necessary distance information about the features of the environment in respect to the platform may be provided by a stereo-camera system or it may be determined by an additional sensor configured to measure distances. If one of the two sensors is outside of the mobile platform information about the location of this sensor in respect to the mobile platform is to be provided. The respective sequence of semantically classified grids may be based on a 2-dimensional reference system oriented parallel to the ground like a bird's eye view and this reference system is centered with an origin at the mobile platform. By using the data of the two sensors this grid may be filled only partially with semantic information because the used sensors point in a specific direction at a limited angle in respect to the mobile platform as is indicated in FIG. 1 by the sequences of grids representing the environment 13a or 13b.

Any movement of the mobile platform may be taken into account by the transformation into the moving reference system by linear extrapolation of the ego-motion for each image of the sequence of images until a point in time in the future for estimation a prediction of the environment presentation. This point in the future may coincident with the requested time the deep neural net is trained for. This may result in a better prediction about the future because at least static objects will stay at the same site in the moving reference system by taking into account that static objects of the environment around the moving mobile platform seem to move if the platform is moving. This may improve the input data for the estimation of a representation of the environment and may result in a better output tensor of the deep neural net in a subsequent step of the method in accordance with an example embodiment of the present invention. If the method is used to compensate for system latency, the point in time may be chosen respectively.

This means that the sequences of semantic labeled features of the environment grids are aligned by this transformation in respect to the spatial orientation of the sensors, and they are chronological aligned using the time markers and the ego-motion of the platform to extrapolate the grids to a point in time in the future.

The input tensor is created by stacking 14 these grids resulting from the sequences of semantic labeled features of the environment of the two digital cameras.

On the base of the input tensor, the deep neural net is generating 15 an output tensor that represents the environment at a requested point in time. Therefore, upfront of application of the method for environment representation in accordance with example embodiments of the present invention, the deep neural network is trained with training input tensors and true information training output tensors as to accurately reproduce arbitrary environment representations at the requested point in time. The encoder-decoder deep neural network (ED) 15 fuses these grids provided by the input tensor mainly in respect of the dynamic objects, which cannot be correctly transformed using the ego-motion, and estimates a prediction about the environment dynamics because the dynamic objects may move between the time marker of the first image and the requested time in the future.

The output tensor of the deep neural net may be visualized 16 as a 2-dimensional map with color coded classes of semantic information by a grid representing the moving reference system like a bird's eye view on the scene of the environment around the mobile platform. Such a grid 16 is schematically shown in FIG. 1.

Figure 2:
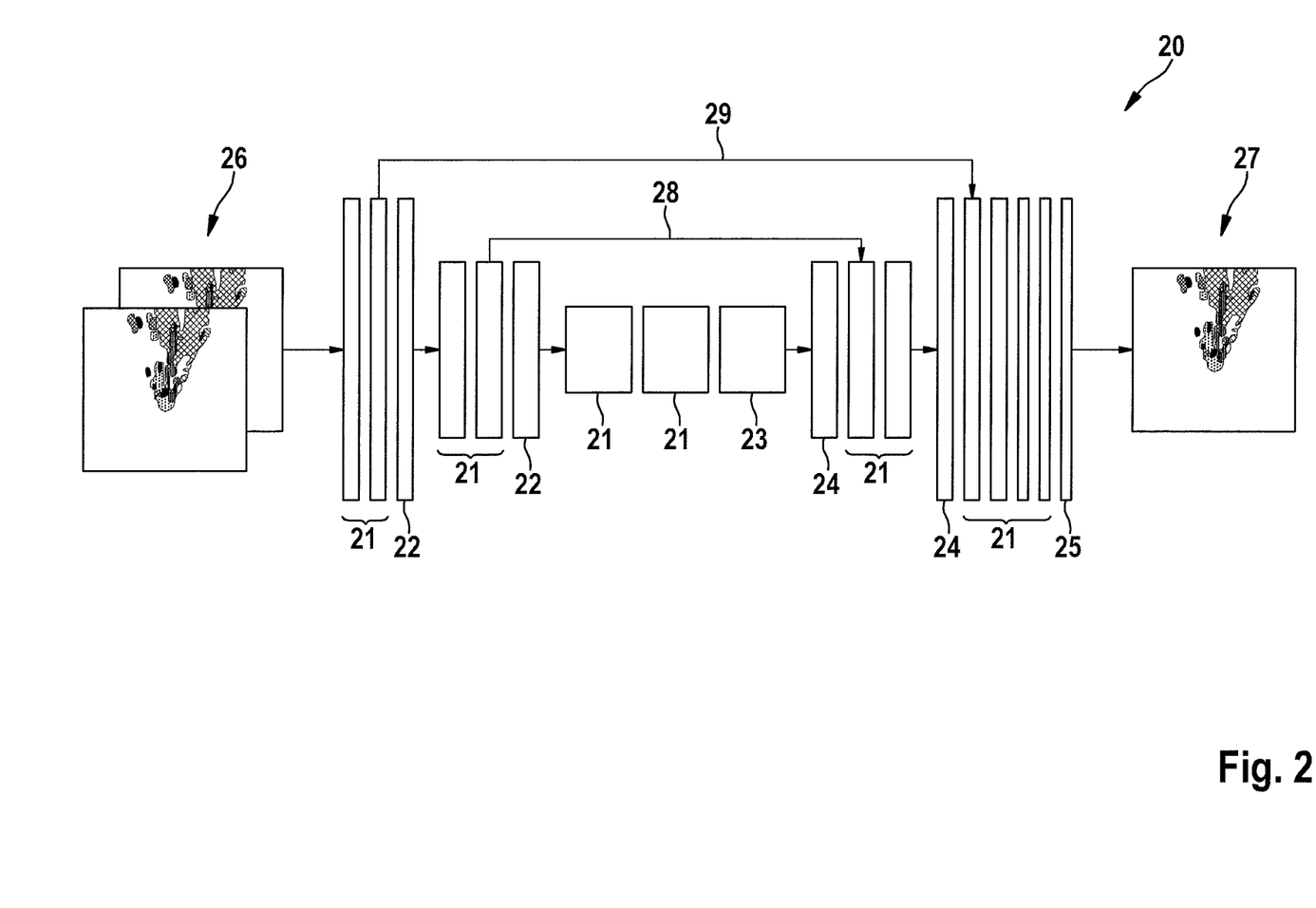
FIG. 2 schematically shows details of the Encoder-decoder for generation of the output tensor, in accordance with an example embodiment of the present invention.

FIG. 2 describes the internal structure of the deep neural network 20, which may be used for generating the output tensor, which represents the environment at the requested point in time. The encoder decoder (ED) 20 may consist of a CNN encoder and a CNN decoder. The Encoder is built of d, e.g., d=3 blocks, where d is the depth of the ED. Each block may contain 2 convolutional layers 21, which include batch normalization and ReLU activation, and one max pooling layer 22. The convolutional kernel size may be 3×3 and the pooling kernel size 2×2. In that way, the spatial resolution of the latent space is reduced by a factor of 8 after the third block. Each block doubles the number of feature maps per convolutional layer starting with f features. The last block additionally may have a dropout layer 23 with a dropout rate of 0.5. The decoder may consist of d−1 blocks. Each block up samples 24 its input and may apply a 2×2 convolution. The up sampled output may be combined with the output of the encoder block with the same size through skip connections 28, 29 and fed into two convolutional layers 21; this may include batch normalization and linear activation. The last block has two additional convolutional layers 21 reducing the number of feature maps until it is equal to the number of classes. Finally, a softmax 25 may be applied.

Figure 3:
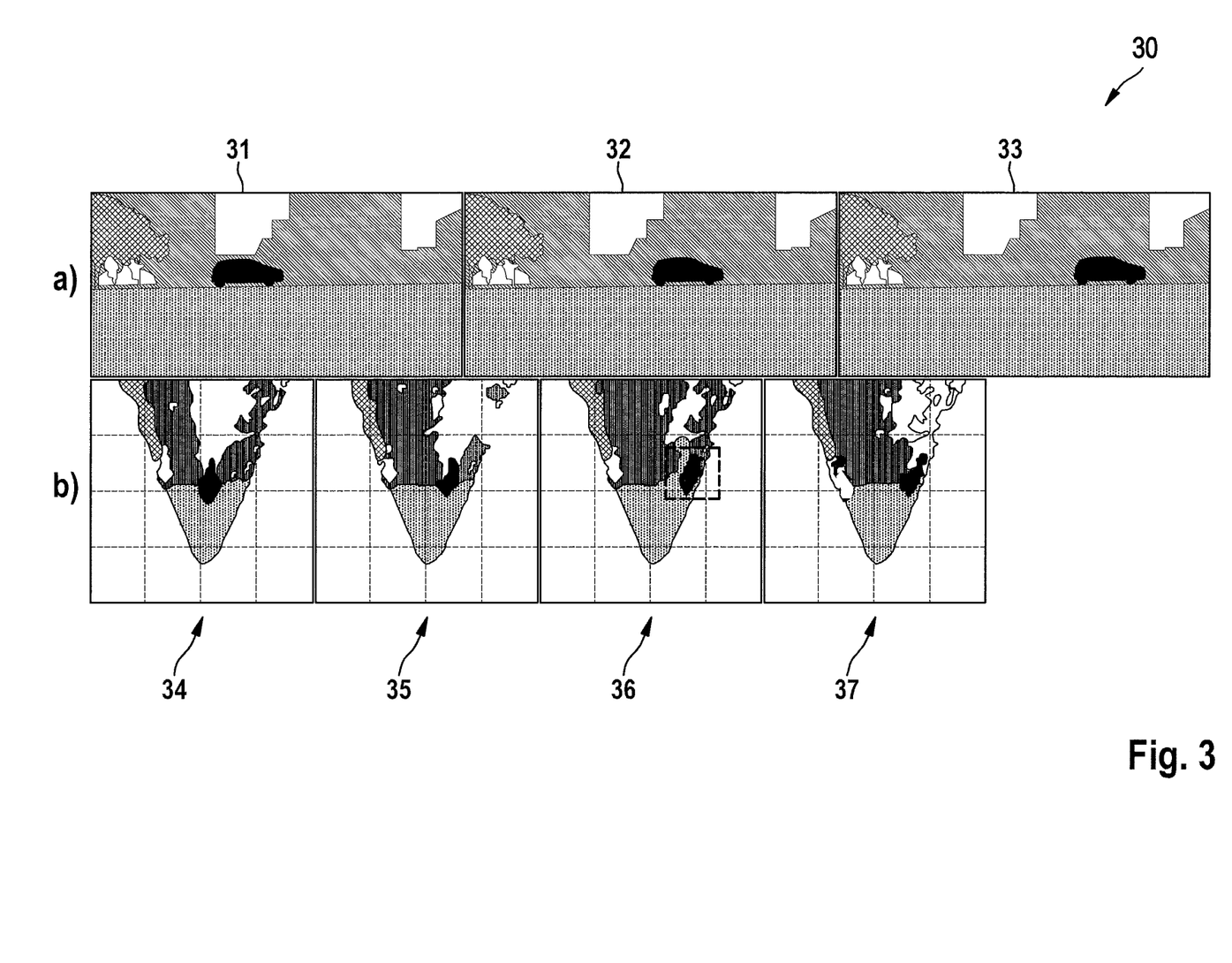
FIG. 3a shows a sequence of semantically labeled frames, in accordance with an example embodiment of the present invention.
FIG. 3b shows the semantic grids associated to the frames of FIG. 3a and the predicted semantic grid as well as the target grid, in accordance with an example embodiment of the present invention.

FIG. 3 schematically shows a prediction sequence 30 resulting from the method in accordance with an example embodiment of the present invention. The upper images 3a) show a sequence of semantic segmentations of the images 31 and 32, where a car is driving from left to right and the target image 33. The corresponding semantic grids are shown in 3b), where the grids 34 and 35 are resulting from the sequence of semantic segmented images 31 an 32, grid 36 represents the prediction. This prediction can be compared with a target grid 37, which show a good match.

Figure 4:
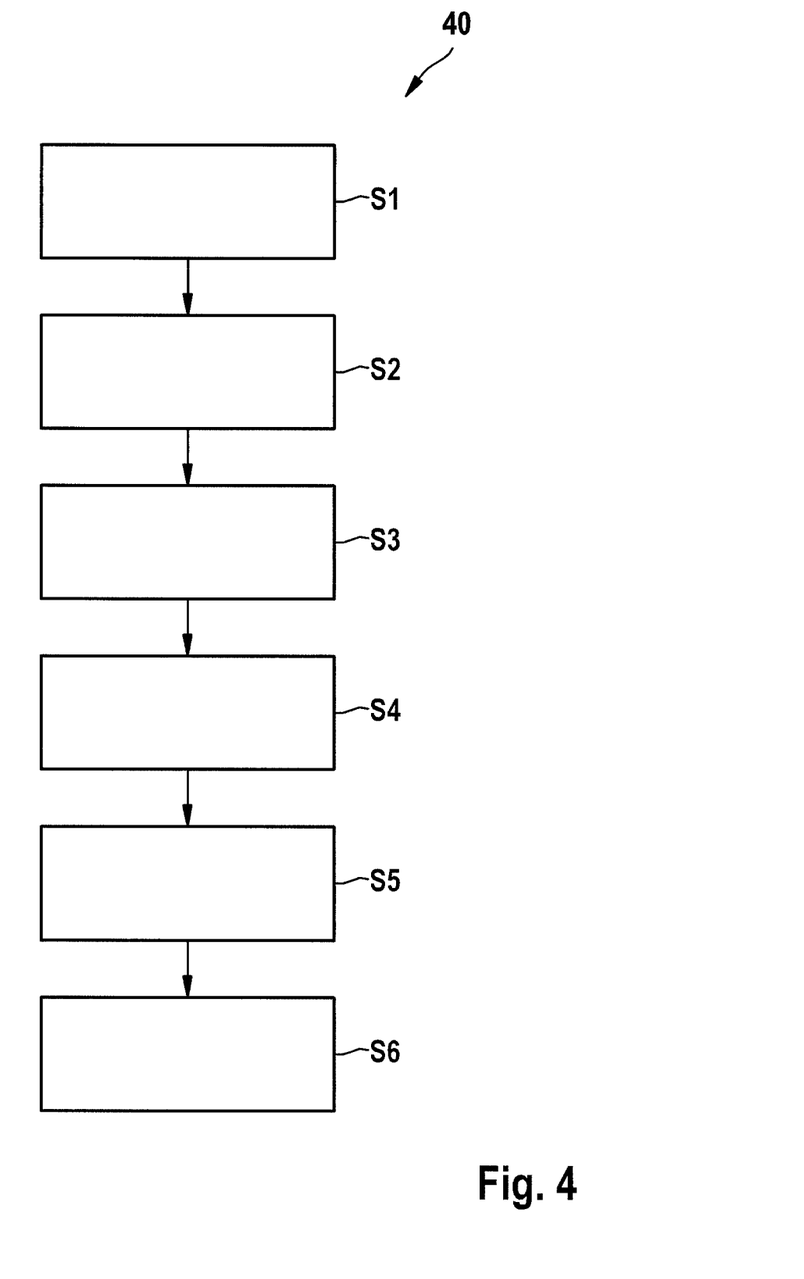
FIG. 4 shows the steps of a method for environment representation, in accordance with an example embodiment of the present invention.

FIG. 4 shows the method 40 of environment representation of a first mobile platform, wherein features of the environment are captured 51 by discrete time sequences of sensor-data originating from at least two sensors and respective time markers. Distances of the first mobile platform to the features of the environment are determined S2 and the semantic representation of the features of the environment is estimated S3. The semantic representation of the features of the environment is transformed S4 into a moving spatial reference system, wherein a position of the first mobile platform is at a constant site, using the respective determined distances and respective time markers.

An input tensor is created S5 using sequences of the transformed semantic representation of the features of the environment, corresponding to the sequences of the sensor data of the at least two sensors.

An output tensor is generated S6 that represents the environment using a deep neural network at a requested point in time and the input tensor, wherein the deep neural network is trained with training input tensors and true information training output tensors as to accurately reproduce arbitrary environment representations at the requested point in time.

Figure 5:
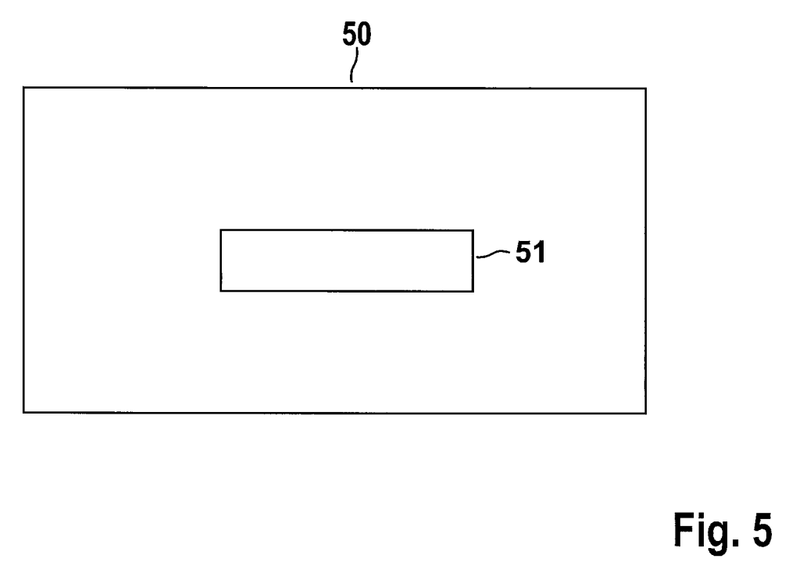
FIG. 5 shows an at least partially autonomous system, in accordance with an example embodiment of the present invention.

FIG. 5 shows an at least partially autonomous system 50 having a controller 51, which is configured to carry out the method according to the method described above, and to execute a motion action of the at least partially mobile platform 50 depending on the content of the output tensor.

The invention claimed is:

1. A method for representing an environment of a first mobile platform, the method comprising the following steps:
    capturing features of the environment by discrete time sequences of sensor-data originating from at least two sensors and respective time markers;
    determining distances of the first mobile platform to the features of the environment;
    estimating semantic information of the features of the environment, using the sequences of data of each of the sensors characterizing the environment;
    transforming the semantic information of the features of the environment into a moving spatial reference system using spatial reference information and temporal reference information sensor-feature-wise, and model-based into a 2- or 3-dimensional grid representation, wherein a position of the first mobile platform is at a constant site, using the respective determined distances and respective time markers;
    creating an input tensor, using sequences of the transformed semantic representation of the features of the environment, corresponding to the sequences of the sensor data of the at least two sensors by stacking 2-dimensional grids, generated by the transformation of spatial coordinates of the sensors to the moving spatial reference system, including semantic representation of the data from a plurality of different sensors; and
    generating an output tensor that represents the environment using a deep neural network at a requested point in time and the input tensor to fuse the semantic grids of all individual ones of the sensors included in the input tensor and yield a predictive semantic grid output tensor at the requested time, wherein the deep neural network is trained with training input tensors and true information training output tensors as to accurately reproduce arbitrary environment representations at the requested point in time.

2. The method according to claim 1, wherein the sensor-data originate from at least one sensor which is mechanically connected to the first mobile platform.

3. The method according to claim 1, wherein the semantic information and/or the physical information of the features of the environment into the moving spatial reference system is transformed by taking into account an ego-motion of the first mobile platform.

4. The method according to claim 1, wherein at least one sensor of the at least two sensors is mechanically connected to a second mobile platform.

5. The method according to claim 1, wherein each of the at least two sensors are moving independently from the first mobile platform.

6. The method according to claim 1, wherein the determining of the distances of the first mobile platform to the features of the environment is performed by using a stereo camera, or a LIDAR-sensor, or a RADAR-sensor, or an Ultrasound-sensor, or a neural network technique.

7. The method according to claim 1, wherein the semantic information of the features of the environment is generated by using a neural network.

8. The method according to claim 1, wherein the deep neural network is an encoder-decoder convolutional neural network.

9. The method according to claim 1, wherein the output tensor is generated to predict the environment using a deep neural network, wherein the deep neural network is trained with training input tensors and real world training output tensors as to accurately predict arbitrary environment information.

10. The method according to claim 1, wherein a motion action of the at least partially mobile platform is executed depending on content of the output tensor.

11. A non-transitory computer-readable storage medium on which is stored a computer program for representing an environment of a first mobile platform, the computer program, when executed by a computer, causing the computer to perform the following steps:
   capturing features of the environment by discrete time sequences of sensor-data originating from at least two sensors and respective time markers;
   determining distances of the first mobile platform to the features of the environment;
   estimating semantic information of the features of the environment, using the sequences of data of each of the sensors characterizing the environment;
   transforming the semantic information of the features of the environment into a moving spatial reference system using spatial reference information and temporal reference information sensor-feature-wise, and model-based into a 2- or 3-dimensional grid representation, wherein a position of the first mobile platform is at a constant site, using the respective determined distances and respective time markers;
   creating an input tensor, using sequences of the transformed semantic representation of the features of the environment, corresponding to the sequences of the sensor data of the at least two sensors by stacking 2-dimensional grids, generated by the transformation of spatial coordinates of the sensors to the moving spatial reference system, including semantic representation of the data from a plurality of different sensors; and
   generating an output tensor that represents the environment using a deep neural network at a requested point in time and the input tensor to fuse the semantic grids of all individual ones of the sensors included in the input tensor and yield a predictive semantic grid output tensor at the requested time, wherein the deep neural network is trained with training input tensors and true information training output tensors as to accurately reproduce arbitrary environment representations at the requested point in time.

12. An at least partially autonomous system, comprising:
a controller configured to represent an environment of a first mobile platform, the controller configured to:
   capturing features of the environment by discrete time sequences of sensor-data originating from at least two sensors and respective time markers;
   determining distances of the first mobile platform to the features of the environment;
   estimating semantic information of the features of the environment, using the sequences of data of each of the sensors characterizing the environment;
   transforming the semantic information of the features of the environment into a moving spatial reference system using spatial reference information and temporal reference information sensor-feature-wise, and model-based into a 2- or 3-dimensional grid representation, wherein a position of the first mobile platform is at a constant site, using the respective determined distances and respective time markers;
   creating an input tensor, using sequences of the transformed semantic representation of the features of the environment, corresponding to the sequences of the sensor data of the at least two sensors by stacking 2-dimensional grids, generated by the transformation of spatial coordinates of the sensors to the moving spatial reference system, including semantic representation of the data from a plurality of different sensors; and
   generating an output tensor that represents the environment using a deep neural network at a requested point in time and the input tensor to fuse the semantic grids of all individual ones of the sensors included in the input tensor and yield a predictive semantic grid output tensor at the requested time, wherein the deep neural network is trained with training input tensors and true information training output tensors as to accurately reproduce arbitrary environment representations at the requested point in time;
wherein the controller is configured to execute or initiate a motion action of the at least partially autonomous system depending on content of the output tensor.

* * * * *